INVENTORS
ANTHONY RENE BARRINGER
GEORGE ARNOLD LANTZ
BY Rogers & Bereskin

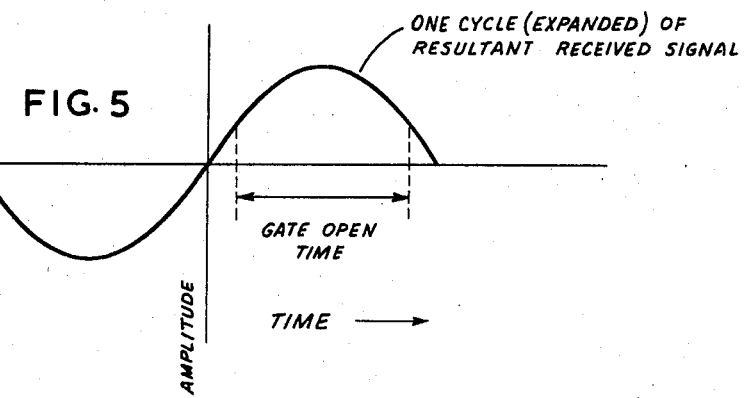
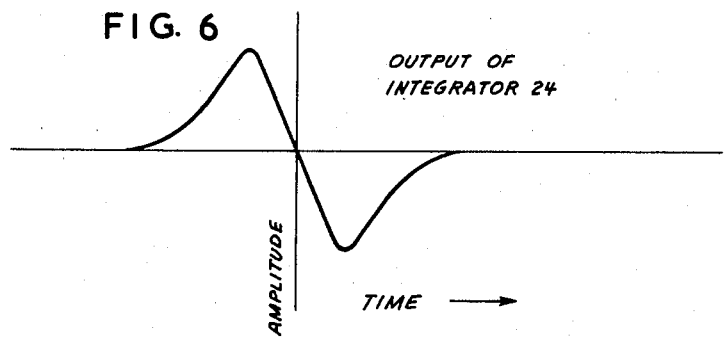
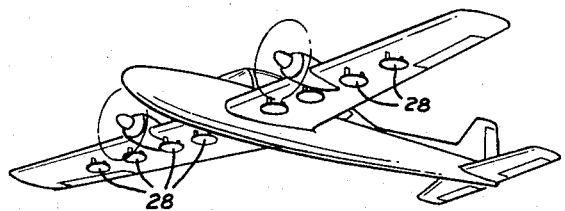
FIG. 7

INVENTORS
ANTHONY RENE BARRINGER
GEORGE ARNOLD LANTZ
BY~
Rogers & Bereskin

United States Patent Office

3,437,914
Patented Apr. 8, 1969

3,437,914
METHOD AND APPARATUS FOR REMOTE SENSING OF SUBSTANCES HAVING CHARACTERISTIC MAGNETIC RESONANCE PROPERTIES
Anthony Rene Barringer, Willowdale, Ontario, and George Arnold Lantz, Richmond Hill, Ontario, Canada, assignors to Barringer Research Limited, Rexdale, Ontario, Canada, a corporation
Filed May 24, 1965, Ser. No. 458,218
Int. Cl. G01n 27/72
U.S. Cl. 324—0.5                                     16 Claims

ABSTRACT OF THE DISCLOSURE

Method and apparatus are disclosed for remote detection of selected substances utilizing magnetic resonance phenomenon. Radio frequency energy is transmitted toward the earth to cause magnetic resonance absorption in substance in the earth. Resonance signals radiated from the earth are received and their characteristics measured to determine the presence of the selected substance.

---

This invention relates to the identification of a substance from a remote station by producing and verifying the production of magnetic resonance effects in the substance and in particular to a prospecting method and apparatus for locating and identifying mineral deposits by producing and verifying the production of spin precessions in the mineral.

The principal magnetic resonance effects with which the invention is concerned are nuclear magnetic resonance, nuclear quadrupole resonance, electron spin resonance, electron paramagnetic resonance, electron ferromagnetic resonance and electron ferrimagnetic resonance.

Magnetic resonance generally refers to a phenomenon exhibited by the magnetic spin systems of certain atoms, and is characterized by energy absorption by the spin systems at a natural resonance frequency or frequencies when the systems are subjected to alternating magnetic fields. Nuclear magnetic resonance is exhibited by nuclei which possess angular momentum or spin and nonvanishing magnetic moments. Nuclear quadrupole resonance is exhibited by nuclei having an ellipsoidal configuration. Paramagnetic resonance arises from electrons in paramagnetic substances or from electrons in paramagnetic centers in diamagnetic substances, and similarly ferromagnetic and ferrimagnetic resonance arise from electrons in ferromagnetic and ferrimagnetic substances, respectively.

All spin systems which exhibit these resonance effects possess a magnetic moment $\vec{M}$, angular momentum $\vec{J}$, and suffer torques due to the effect of a magnetic field $\vec{H}$ on the magnetic moment $\vec{M}$. The torque $\vec{M} \times \vec{H}$ causes the angular momentum $\vec{J}$ of the system to vary in time in accordance with the equation $$\frac{d\vec{J}}{dt} = \vec{M} \times \vec{H}$$

and the resultant motion of $\vec{M}$ is a precession at an angular frequency $\gamma \vec{H}$ about the direction of $\vec{H}$, where $\gamma$ is the gyromagnetic ratio. A nucleus, for example, which has an angular momentum and which is subjected to a magnetic field, suffers a torque due to the effect of the magnetic field on the nuclear magnetic moment. This causes the nucleus to precess about the field at a constant frequency. If such a system is subjected to a changing magnetic field the frequency of which is the same as a natural resonance frequency of the system, energy will be absorbed by the system. If the applied field is removed the system will return to its original equilibrium condition and will radiate the absorbed energy.

Heretofore these effects have been observed by directly coupling a sample of a substance to a varying magnetic field, for example by placing the sample inside a coil or in the magnetic field region of a microwave cavity. The applied field is then usually varied until resonance absorption is observed. There are various other techniques for identifying resonance absorption but all such techniques depend upon subjecting the sample to a relatively intense inductive field.

It is now proposed to couple energy from a radio frequency electromagnetic field instead of an inductive field into spin systems of a substance to induce magnetic resonance. This permits the generation of the applied field and the sensing of the return radiation to be performed at a station that is remote from the substance. Applied to the art of mineral prospecting, the invention permits the location and identification of buried minerals which exhibit resonance effects from a remote station such as an aircraft or a land vehicle.

As stated above, magnetic resonance effects depend upon the effect of some magnetic field upon spin systems of a substance. The magnetic field can be supplied externally (e.g. by a current-carrying coil) or internally (e.g. by the physical structure of the substance itself). Fortunately, many minerals of economic interest posess internal magnetic fields and exhibit characteristic resonances in the radio frequency range without having to be subjected to external magnetic fields. This facilitates prospecting for such minerals, for no external magnetic field need be applied. In this regard, nuclear quadrupole resonance is of particular importance because in many substances the nuclear electric quadrupole interaction energy is strong enough to give rise to resonances in the radio frequency spectrum, with no external magnetic field. Other magnetic resonance effects in certain substances are also important: the element cobalt, for example, exhibits a strong nuclear ferromagnetic resonance at a frequency of about 213 megacycles per second (mc./s.) with a linewidth of about 200 kilocycles per second (kc./s.). If sufficient energy is coupled into cobalt nuclei at this frequency the cobalt nuclei will precess, as explained above, and will absorb energy. When the supply of energy ceases, the cobalt nuclei will release the absorbed energy in the form of a characteristic delay oscillation transient at the precession frequency of 213 mc./s. and this oscillation can be sensed by a sensitive receiver.

An object of the present invention is therefore to identify a substance by producing and verifying the production of magnetic resonance effects in the substance from a remote station.

Another object of the invention is to locate and identify deposits of a mineral in the earth from the surface of the earth or from the air by producing and sensing spin precessions in the mineral.

Preferred examples of the invention are illustrated in the accompanying drawings, in which:

FIG. 1 is a block diagram of a system for producing and sensing magnetic resonance effects using frequency modulated radio frequency electromagnetic pulses;

FIGS. 2, 3, and 4 are graphs showing various tuning conditions of the system of FIG. 1 in relation to a typical absorption/radiation envelope;

FIG. 5 is a graph showing the relationship between a single cycle of received signal corresponding to the tuning condition of FIG. 3 and the gate open time;

FIG. 6 is a graph showing a typical curve traced by recorder as the system of FIG. 1 is tuned through the absorption linewidth;

FIG. 7 is a perspective view of an array of dielectric disc antennas fitted to the underside of an aircraft;

Figure 1:
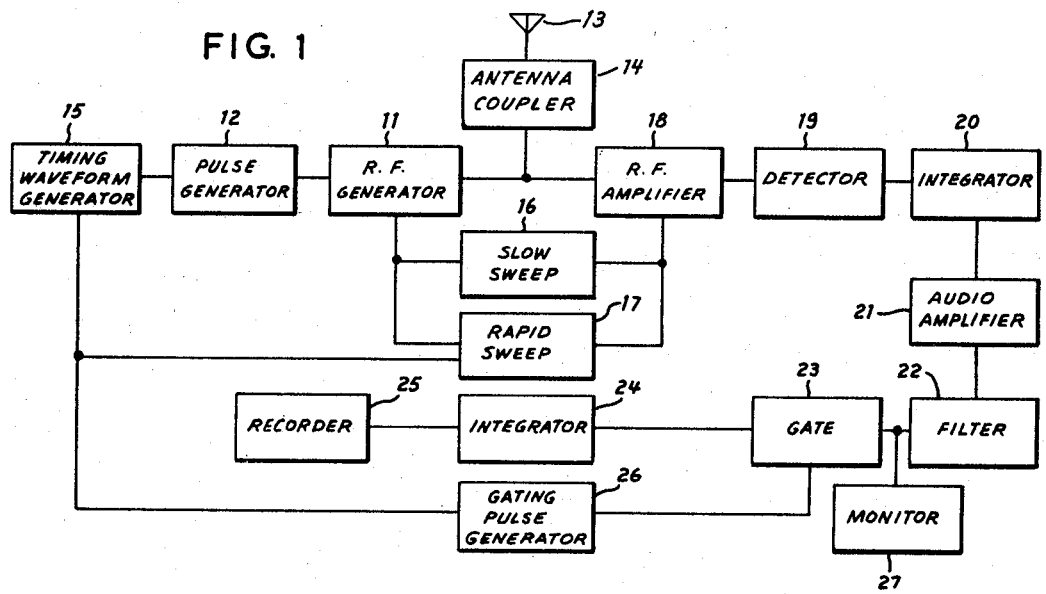

The system of FIG. 1 is adapted to transmit to the earth a repetition of abruptly terminated frequency modulated radio frequency electromagnetic pulses, and to receive characteristic radiation from spin systems of the mineral as the spin systems return to equilibrium after the termination of each pulse. The system is capable of discriminating between the characteristic radiation and spurious signals such as reflections and noise; this is possible because every magnetic resonance has electrical characteristics which uniquely define the substance in which the resonance occurs. Cobalt, for example, is uniquely defined by the 213 mc./s. resonance frequency with the 200 kc./s. linewidth, and by a characteristic absorption/radiation envelope. Similarly, the resonance frequency, linewidth and absorption/radiation envelope of any such substance is characteristic of the substance. What is required, then, is a system for discriminating between signals which contain this information and signals such as reflections and noise which do not.

In the description below, reference is made by way of example to cobalt as the mineral to be identified. As stated above, cobalt exhibits relatively strong ferromagnetic resonance absorption at 213 mc./s., with a linewidth of about 200 kc./s. The internal magnetic field of cobalt is about 210,000 gauss.

In FIG. 1 the transmitting portion of the system includes a radio frequency generator 11 which is controlled by a pulse generator 12. The output of the radio frequency generator 11 consists of a repetition of radio frequency pulses which are coupled to an antenna 13 through an antenna coupler 14, the function of which is to match the antenna 13 to the radio frequency generator 11. The pulse generator 12 is timed by a timing waveform generator 15 and the radio frequency generator 11 is frequency modulated by two sweep generators 16 and 17. The sweep generator 16 tunes the radio frequency generator 11 relatively slowly across the absorption linewidth, and at the same time the sweep generator 17 tunes the radio frequency generator 11 relatively rapidly but across a more narrow range. For example, for sensing the cobalt absorption line at 213 mc./s. the sweep generator 17 tunes between about 212.8 mc./s. to 213.2 mc./s. in about one minute, and the sweep generator tunes a 100 kc./s. range in about 5 milliseconds. For optimum signal strength, the sweep of the sweep generator 17 should be about one half the linewidth of the line being investigated. The sweep generator 17 is controlled by the timing waveform generator 15, so the commencement of each 100 kc./s. sweep coincides with the initiation of each pulse.

The receiving section of the system includes a radio frequency amplifier 18 the input of which is coupled to the antenna coupler 14. Like the radio frequency generator 11, the radio frequency amplifier 18 is tuned by the sweep generators 16 and 17 so it automatically tracks with the radio frequency generator 11. The coupling between the antenna 13 and the radio frequency generator 11 is such that the level of the radio frequency energy generator 11 is reduced to a very low level at the input of the radio frequency amplifier 18. The amplified output of the radio frequency amplifier 18 is fed through a detector 19, a first integrator 20, an audio amplifier 21, a filter 22, a gate 23, a second integrator 24 and finally to a recorder 25. The gate is controlled by a gating pulse generator 26 which is timed by the timing waveform generator 15, and if desired the output of the filter 22 can be displayed by a monitor 27 such as an oscilloscope.

When no precession signals are being received, the output of the radio frequency amplifier 18 is the amplified steady low level signal which is attributable to the radio frequency generator 11 and to noise; after rectification and summing by the detector 19 and the integrator 20 respectively, these signals are converted to a constant direct current voltage. When the desired precision signals are being received these signals are in the form of an alternating current voltage that is impressed upon the direct current voltage, and this alternating current voltage is amplified by the audio amplifier 21. The signal to noise ratio of the system is enhanced by the filter 22 which is tuned to the repetition rate of the pulse generator 12.

Figure 2:
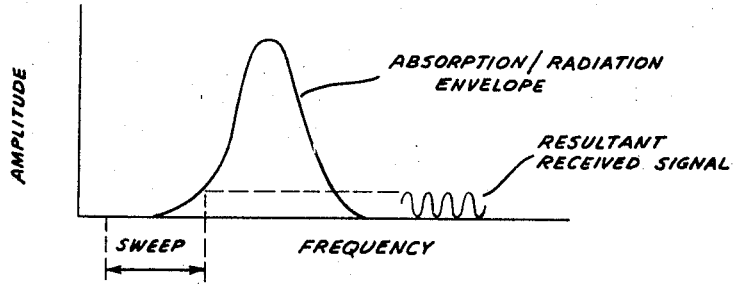
Figure 3:
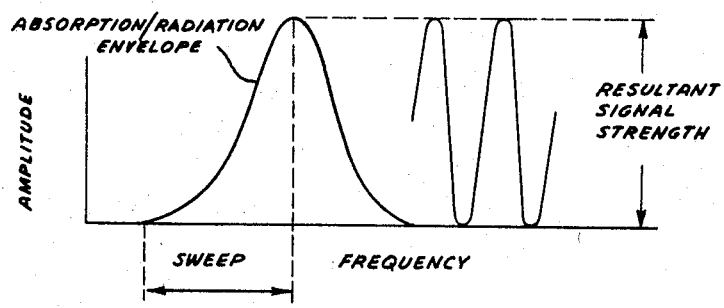
Figure 4:
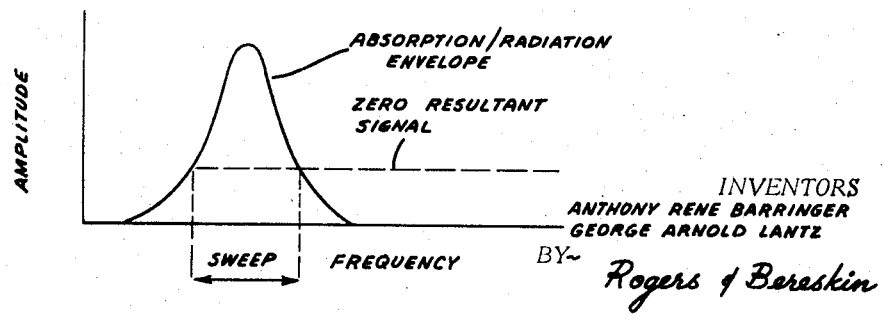

Assuming that the radio frequency generator 11 and the radio frequency amplifier 18 are being tuned towards the absorption line from a frequency to one side of the absorption line, at first no resonance radiation will be received because no transmitted energy is within the absorption linewidth, and noise, etc. passing through the gate 23 is integrated to zero. The gate 23 is synchronized with the sweep generator 17 (rapid sweep), and it is open during periodic intervals that bear a constant phase relationship with the frequency of the absorption line. As the tuning of the system approaches the absorption line (see FIG. 2) from the low frequency end, for example, a small positive signal passes through the gate and is recorded. This small signal is indicated in FIG. 2 as "resultant received signal." As the tuning approaches the condition shown in FIG. 3 where the sweep generator 17 is sweeping all the lower frequency half of the absorption line, the signal passing through the gate builds to a maximum and it consists of a repetition of coherent positive half cycles. This is shown in FIG. 5. Thus, up to this point, the integrator 24 has delivered a positive signal of relatively slowly increasing magnitude which reaches its positive peak when the tuning of the system is that shown in FIG. 3. Now as the tuning progresses, the signal passing through the gate 23 begins to rapidly diminish in amplitude, and when the tuning is such that the sweep is exactly centered in the absorption line, the signal passing through the gate drops to zero; this condition is shown in FIG. 4. Further tuning results in negative pulses passing through the gate 23. These negative pulses are summed by the integrator 24 to a maximum negative voltage, and as the tuning progresses the output of the integrator 24 again slowly approaches zero but from the negative side. Thus, the graph produced by the recorder 25 is a function of the time derivative of the shape of the absorption/radiation envelope being investigated, and of nothing else. FIG. 6 shows such a graph. The positive maximum in FIG. 6 represents the tuning condition shown in FIG. 3, and the negative minimum represents the converse tuning condition to that of FIG. 3, when the rapid sweep is sweeping all the upper frequency half of the absortion linewidth. The point where the curve crosses the axis between the maximum and the minimum represents the tuning condition when the rapid sweep is centered in the absorption linewidth so that the output of the gate 23 drops to zero.

It will now be clear that the above described system can be modified to suit the characteristics of any absorption line. In other words, when the frequency and linewidth of a substance are known (determined experimentally, perhaps, or ascertained from the literature), the system can be adapted to sense the particular absorption line. Thus, if a certain substance exhibits an absorption line at 20 mc./s. that is 20 kc./s. wide, the radio frequency generator 11, the radio frequency amplifier 18, and the two sweep generators 16 and 17 would be adapted to this frequency and linewidth.

It is preferable to couple as much energy into the spin systems as they can absorb. The optimum pulse repetition rate and pulse width can be determined experimentally for a particular substance; the optimum repetition rate for cobalt appears to be about 200 kc./s. with the pulses on and off about equal time.

The system shown in FIG. 1 can be modified in several ways. For example, a gate might be provided between the antenna coupler 14 and the radio frequency amplifier 18 to short out the input of the radio frequency amplifier 18 except during the intervals between the transmitted pulses. Separate antennas could be used for transmitting and receiving. Also, if the bandpass of the radio frequency amplifier 18 is sufficiently broad so that it includes the entire absorption linewidth, automatic tuning of the radio frequency amplifier 18 by the sweep generators 16 and 17 would be obviated. In addition, the system can be modified to utilize a single sweep instead of two sweeps. The single sweep would sweep the entire absorption linewidth, and the monitor 27 (e.g. an oscilloscope) would be synchronized with the sweep and would therefore display a representation of the absorption/radiation envelope if precession signals are received. Recordings could be made on magnetic tape, for example, of the signals which appear at the input of the monitor 27.

The antenna 13 is an important part of the system, and its function is to direct as much radio frequency energy as possible towards the earth. Thus the antenna 13 must load well (i.e. absorb as much energy as possible from the radio frequency generator 11), and concentrate this energy into a beam. In addition, the antenna must be tuned to the frequency of the absorption line and its frequency response must be broad enough to cover the entire linewidth. The ring time of the antenna is also important; in the case of cobalt, for example, the relaxation time (i.e. the time for precessing nuclei to return to their original states) is about 5 microseconds, so the time constant or ring time of the antenna should be about one microsecond or less. An antenna Q of 10 yields a time constant of 1.25 microseconds at this frequency for cobalt.

It has been found that a dielectric antenna satisfies these requirements, and is well suited for airborne use. It was found that relatively large flat dielectric radiators provide good signal to noise figures, and it appears that the sensitivity of the antenna is a function of the antenna's radiating area. Consequently, a preferred form of antenna is a flat disc of dielectric material that is center fed. The dimensions of the antenna depend upon the required resonant frequency and the dielectric constant of the dielectric material. While there is considerable leeway in the choice of dielectric constant, a range of between about 20 to 30 appears to be satisfactory; if the dielectric constant is higher the radiating area of the antenna is correspondingly reduced, and if the dielectric constant is too low the antenna becomes less efficient a radiator.

The dielectric material can be a natural dielectric which is dipolar in nature or else an artificial dielectric such as polystyrene foam in which is embedded finely dispersed metal particles. The latter kind of material is attractive for airborne use since it is of relatively low density.

In order to increase the radiating area it is preferable to use a plurality of dielectric disc antennas each of which is tuned to the resonance frequency. FIG. 7 shows a plurality of dielectric disc antennas 28 fitted to the underside of an aircraft's wings. The antennas are, of course, properly phased so that signal reinforcement occurs. Each antenna is preferably spaced sufficiently from the wing that reflections from the wing surface reinforce the signal radiated by the antenna.

Incidentally, although an antenna has been shown in the above system and in the systems to be described below, it is to be understood that a tuned coil could be used instead of an antenna for those frequencies in the lower radio frequency spectrum (e.g. below about 50 mc./s.), provided that enough energy can be coupled into the spin systems of the mineral. The above described antennas are preferred for airborne use but coils might be useful with a land vehicle.

Figure 8:
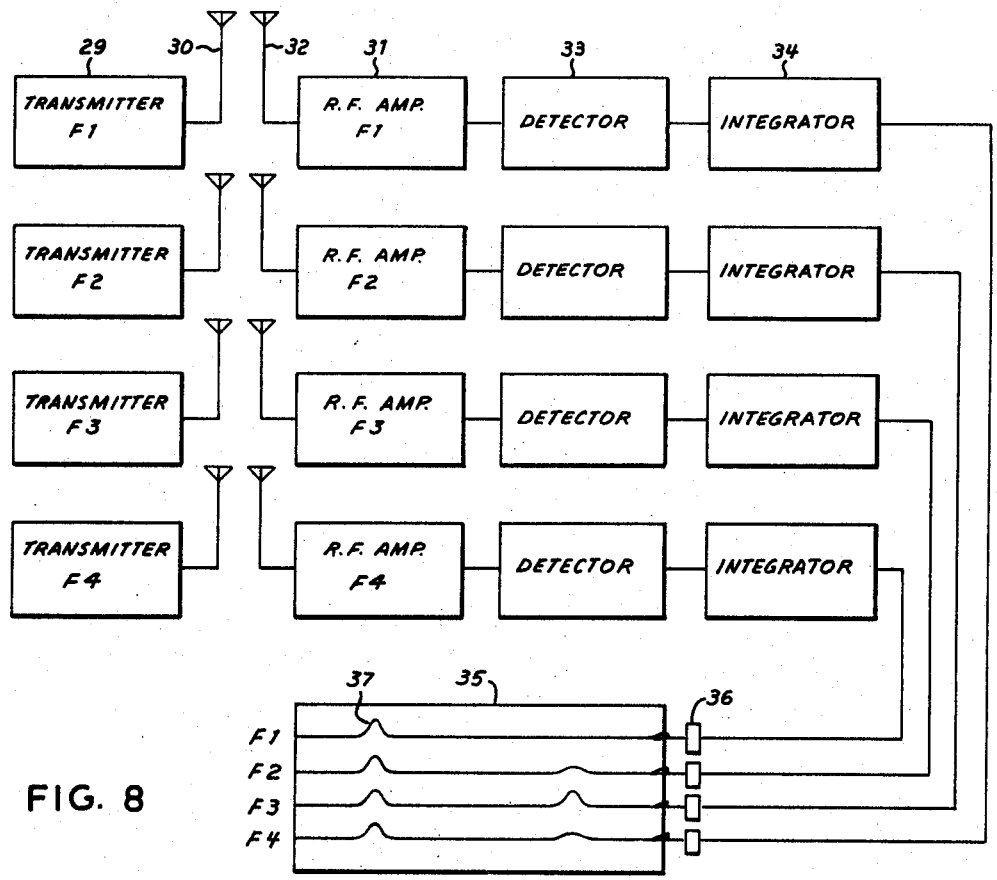
FIG. 8 is a block diagram of a system which includes a plurality of fixed frequency transmitting and receiving channels.
Figure 9:
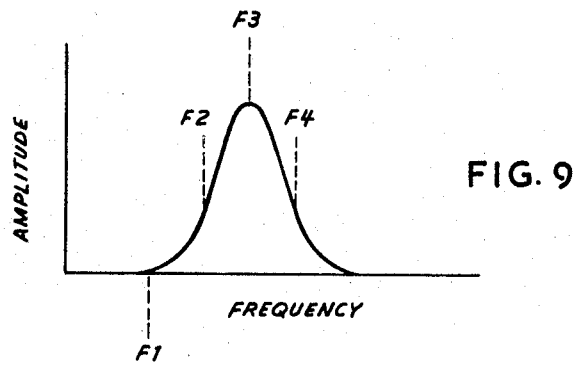
FIG. 9 is a graph showing an absorption/radiation envelope and its relationship to channel frequencies F1, F2, F3 and F4.

In the system shown in FIG. 8 a plurality of single frequency transmitters is used instead of a frequency modulated transmitter as in the system shown in FIG. 1. The frequency of each transmitter is accurately controlled, for example by using a crystal controlled oscillator, and the frequencies of the transmitters are within the absorption linewidth of a particular substance or mineral. Four channels are shown in FIG. 8 by way of example, and the channel frequencies are indicated as F1, F2, F3 and F4 respectively. FIG. 9 shows the relationship between these frequencies and an absorption/radiation envelope. Frequency F1 is just outside the envelope, frequencies F2 and F4 are each about half way up the skirt of the envelope and frequency F3 is at the peak.

Each channel includes a transmitter 29 which is coupled to a transmitting antenna 30, a radio frequency amplifier 31 which is coupled to an antenna 32, a detector 33 for rectifying the amplified output of the amplifier 31 and an integrator 34 for driving one channel of a recorder 35. The recorder 35 can be a conventional moving paper strip recorder having a pen 36 for each channel. Although separate antennas for receiving and transmitting have been shown, it is to be understood that the same antenna (or array of phased antennas) could be used for both transmitting and receiving, together with the usual TR switch or gate. This statement also applies to the systems to be described below.

In operation (assuming the system is installed in an aircraft) as the aircraft flies over the earth the recorder 35 records reflections from the earth and other spurious noises (these are not shown in FIG. 8, for simplicity). All such signals appear in each channel and when recorded are similar in form. For example, if the aircraft flies over a metal roof (an excellent reflector) all channels record the reflection by upward movement of the pen, as indicated by reference numeral 37 in FIG. 8. However, if the aircraft should fly over a body of the mineral being sought, the characteristic radiation from precessing spin systems of the mineral can be distinguished from reflections, etc. for such radiation contains information relating to the shape of the absorption/radiation envelope of the mineral. Thus, the received radiation is recorded by the recorder 35 as follows. Channel F1 does not respond, for frequency F1 is just outside the absorption linewidth; channels F2 and F4 record a signal of moderate amplitude, and channel F3, tuned to the peak of the absorption/radiation envelope, records a signal of maximum amplitude. Only precession signals from the mineral can result in responses bearing the above relationship to one another. If desired, reflection signals can be separated from the precession signals before recording, by feeding the outputs of the integrators 34 through a device which passes only those signals which possess different instantaneous amplitudes.

Figure 10:
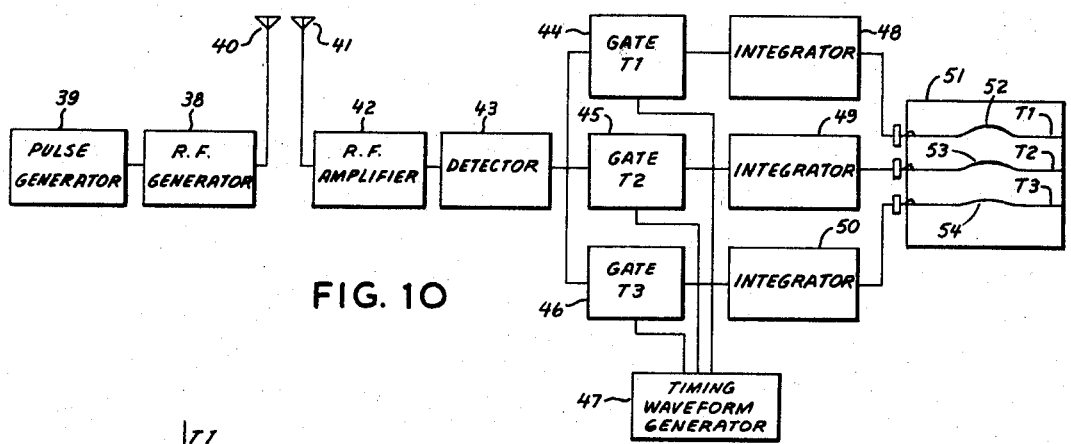
FIG. 10 is a block diagram of a system which is adapted to sense the characteristic decay oscillation transient from a mineral.

The system shown in FIG. 10 is adapted to sense the characteristic decay oscillation transient of a mineral, which is a function of the linewidth of the particular absorption/radiation envelope. A radio frequency generator 38, tuned to a resonance frequency of the mineral to be identified, is controlled by a pulse generator 39. The output of the radio frequency generator 38, comprising a repetition of abruptly terminated radio frequency electromagnetic pulses, is fed to an antenna 40 which radiates the pulses towards the earth. Since the decay oscillation transients from the mineral are generally of short duration (cobalt has a relaxation time of about 5 microseconds, for example) the transmitted pulses must die away promptly to avoid masking the received transients.

An antenna 41 feeds a radio frequency amplifier 42 which is tuned to the frequency of the radio frequency generator 38. Signals received by the antenna 41 are amplified by the radio frequency amplifier 42 and rectified by a detector 43. The rectified output of the detector 43 is fed to gates 44, 45 and 46, respectively, the inputs of which are in parallel. The gate 44 is timed to open at a time T1, the gate 45 is timed to open at a time T2, and the gate 46 is timed to open at a time T3. Timing is provided by a timing waveform generator 47 which provides a suitable timing control signal for each gate. The gates 44, 45 and 46 are respectively connected to integrators 48, 49 and 50 which drive a three channel recorder 51. The function of the gates is to sample selected portions of the rectified received signals; although at least three gates (yielding three selected portions) are preferred, a minimum of two gates would suffice. The selected portions bear a fixed phase relationship to corresponding portions of the decay oscillation transient.

Figure 11:
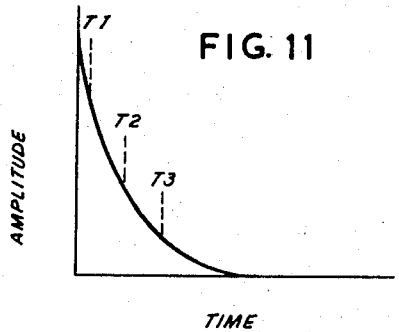
FIG. 11 is a graph showing the relationship between gate open times T1, T2 and T3 and a decay oscillation transient.

The relationship between the gate open times T1, T2 and T3 and the waveform of a typical decay oscillation transient is shown in FIG. 11. Time T1 occurs at a point when the transient is nearly of maximum amplitude, time T2 when the transient is reduced to about one half its maximum amplitude, and time T3 when the transient has nearly diminished to the noise level. Incidentally, since the decay oscillation transient is generated after the termination of a transmitted pulse, reflections of the transmitted pulses can be gated out by simply causing gate 44 to open after all such reflections have died away. The gates which open at later times are not, of course, affected by reflection signals.

If decay oscillation transients are being received, each channel of the recorder 51 records a signal the amplitude of which is a function of the amplitude of the decay oscillation at the time the gate of the particular channel opens. Thus, as shown in FIG. 10, channel T1 records a signal 52 which is of greater amplitude than a corresponding signal 53 of channel T2, and similarly the signal 53 is of greater amplitude than signal 54 of channel T3. The ratios of the amplitudes of the recorded signals 52, 53 and 54 are the same as the corresponding ratios of the characteristic decay oscillation of the mineral if and only if the signals received from the earth are the result of spin precessions in the mineral at the transmitter frequency.

Automatic monitoring of these ratios could be provided by a ratio detector fed, for example, by two appropriately timed gates. The ratio detector, which can be selected from those available commercially, drives a recorder directly.

Figure 12:
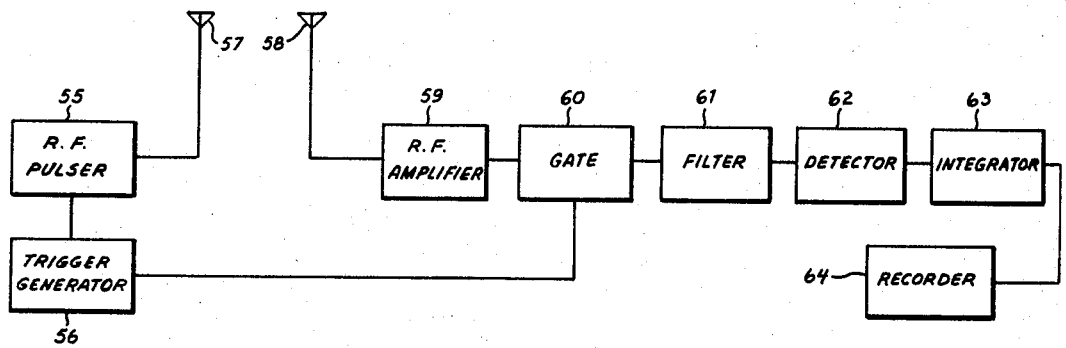
FIG. 12 is a block diagram of another system which is adapted to sense the characteristic decay oscillation transient from a mineral.

The system of FIG. 12 is also adapted to sense the characteristic decay oscillation transient from a mineral. A radio frequency pulsor 55, controlled by a trigger generator 56, generates a repetition of abruptly terminated radio frequency electromagnetic step function pulses which are fed to an antenna 57. The transmitter pulses contain frequency components that are within the resonance frequency linewidth of the mineral being sought. Signals are received from the earth by an antenna 58 and are amplified by a radio frequency amplifier 59 tuned to the resonance frequency. A gate 60 is controlled by the trigger generator 56 and it opens shortly after the termination of each pulse, when reflections from the earth have died away. If precession signals are being received, they are in the form of a decay oscillation transient, and the frequency of the oscillation is the same as the resonance frequency. A filter 61 passes signals of the resonance frequency only. This is important because decay transients might be produced by the transmitter pulses in conductors in the earth, but since such transients would not be impressed on a carrier of the resonance frequency, they cannot pass through the filter 61. The output of the filter 61 is rectified by a detector 62, summed by an integrator 63, and the rectified, summed signals are recorded on a conventional recorder 64. The time constant of the recorded signals can be compared with the time constant of the characteristic decay oscillation transient to determine if absorption has occurred.

What we claim as our invention is:

1. Apparatus for remotely sensing a substance of the kind which exhibits a magnetic resonance effect that is characterized by absorption of radio frequency electromagnetic energy by spin systems of the substance at a natural resonance frequency with a characteristic linewidth, and the effect being further characterized by characteristic radio frequency electromagnetic radiation by the spin systems as they release the absorbed energy, comprising:
   a transmitter for generating a repetition of abruptly terminated radio frequency pulses;
   means for sweeping the transmitter frequency across at least a portion of the absorption linewidth;
   means for radiating the transmitter pulses towards the earth and for receiving radio frequency signals from the earth of the same frequency range as the transmitter pulses;
   a radio frequency amplifier that is adapted to amplify the received signals;
   a detector for rectifying the amplified received signals;
   an integrator for summing the rectified signals; and
   means synchronized with said sweeping means for measuring the amplitude as a function of time of the signals after integration whereby the existence of said substance can be verified by comparing the measured signals with the signals obtained when resonance absorption in said substance is known to occur.

2. Apparatus as claimed in claim 1 wherein the radiating and receiving means comprises a dielectric antenna that is tuned to the transmitter frequency.

3. Apparatus as claimed in claim 2 wherein the dielectric antenna is of circular configuration.

4. Apparatus as claimed in claim 1 wherein the radiating and receiving means comprises a plurality of phased dielectric disc antennas each of which is tuned to the transmitter frequency.

5. Apparatus as claimed in claim 4 wherein there is a phased array of dielectric disc antennas coupled to the transmitter and another phased array of dielectric disc antennas coupled to the radio frequency amplifier.

6. Prospecting apparatus for locating and identifying deposits of a mineral of the kind which exhibits a magnetic resonance effect that is characterized by absorption of radio frequency electromagnetic energy by spin systems of the mineral at a natural resonance frequency with a characteristic envelope and a known linewidth, and the effect being further characterized by characteristic radio frequency electromagnetic radiation by the spin systems as they release the absorbed energy, comprising:
   a transmitter for generating a repetition of abruptly terminated radio frequency pulses;
   timing means for initiating said pulses at timed intervals;
   primary sweep frequency means for sweeping the frequency of the transmitter relatively slowly across the absorption linewidth;
   secondary sweep frequency means for sweeping the frequency of the transmitter relatively rapidly across a frequency range that is less than the absorption linewidth, the secondary sweep frequency means being synchronized with the transmitter pulses by the timing means;
   means for radiating the transmitter pulses towards the earth and for receiving radio frequency signals from the earth of the same frequency range as the said transmitter pulses;
   a radio frequency amplifier that is adapted to amplify the received signals;
   a detector for rectifying the amplified received signals;
   a first integrator for summing the rectified signals;
   a gate through which is fed the summed signals of the first integrator, the opening of the gate being controlled by the timing means;

a second integrator for summing the signals which have passed through the gate; and means for recording the output of the second integrator.

7. Prospecting apparatus as claimed in claim 6 wherein the frequency range of the secondary sweep frequency means is approximately one half the absorption linewidth.

8. Prospecting apparatus as claimed in claim 6 wherein the radiating and receiving means comprises a dielectric antenna that is tuned to the transmitter frequency.

9. Prospecting apparatus as claimed in claim 8 wherein the dielectric antenna is of circular configuration.

10. Prospecting apparatus as claimed in claim 6 wherein the radiating and receiving apparatus comprises a plurality of phased dielectric disc antennas each of which is tuned to the transmitter frequency.

11. Prospecting apparatus as claimed in claim 10 wherein there is a phased array of dielectric disc antennas coupled to the transmitter and another phased array of dielectric disc antennas coupled to the radio frequency amplifier.

12. Prospecting apparatus for locating and identifying deposits of a mineral of the kind which exhibits a magnetic resonance effect that is characterized by absorption of radio frequency electromagnetic energy by spin systems of the mineral at a natural resonance frequency with a characteristic linewidth, and the effect being further characterized by characteristic radio frequency electromagnetic radiation by the spin systems as they release the absorbed energy, comprising:

means for simultaneously producing a plurality of radio frequency signals each having a discrete and different frequency within the resonance frequency linewidth;

means for radiating said radio frequency signals towards the earth and for receiving signals from the earth of the same frequencies as of said radio frequency signals;

a radio frequency receiver having a plurality of channels which respectively contain radio frequency amplifiers tuned to the respective frequencies of said radio frequency signals, detectors respectively coupled to said radio frequency amplifiers for rectifying the outputs thereof, and integrators respectively connected to said detectors for summing the outputs of said detectors, and means for measuring the amplitudes of the summed frequency components of the channels whereby their relative amplitudes can be compared with the relative amplitudes of corresponding frequency components obtained when resonance absorption by said mineral is known to occur.

13. Prospecting apparatus for locating and identifying deposits of a mineral of the kind which exhibits a magnetic resonance effect that is characterized by absorption of radio frequency electromagnetic energy by spin systems of the mineral at a natural resonance frequency with a characteristic envelope having a known linewidth, and the effect being further characterized by characteristic radio frequency electromagnetic radiation by the spin systems as they release the absorbed energy, the radiation comprising a characteristic decay oscillation transient, said apparatus comprising:

a transmitter for generating a repetition of abruptly terminated radio frequency electromagnetic pulses of the same frequency as the resonance frequency;

means for radiating the transmittesr pulses towards the earth and for receiving signals from the earth of the same frequency as the transmitter pulses;

a radio frequency amplifier that is adapted to amplify the received signals;

a detector for rectifying the received signals;

means for sampling a plurality of selected time-spaced portions of the rectified received signals during the period of each said decay oscillation transient;

integrating means for summing each selected portion; and means for measuring the relative amplitudes of each summed selected portion, whereby the relative amplitudes of said summed selected portions can be compared with the relative amplitudes of the corresponding portions of the characteristic decay oscillation transient to determine if absorption has occurred.

14. Prospecting apparatus as claimed in claim 13 wherein the sampling means comprises a plurality of gates which are timed to open at predetermined times after the termination of each transmitted pulse.

15. A method for remotely sensing a substance of the kind which exhibits a magnetic resonance effect that is characterized by absorption of radio frequency electromagnetic energy by spin systems of the substance at a natural resonance frequency with a characteristic envelope having a known linewidth, and the effect being further characterized by characteristic radio frequency electromagnetic radiation by the spin systems as they release the absorbed energy, comprising:

transmitting towards the substance a repetition of frequency modulation, abruptly terminated radio frequency electromagnetic pulses containing a plurality of discrete and different frequency components that are within the resonance frequency linewidth;

receiving from the direction of the substance radio frequency electromagnetic signals in the range of the transmitted frequency components during intervals between successive transmitted pulses;

analyzing the received signals to ascertain the relative absorption of each of said frequency components, and indicating the relative absorption of said frequency components so that the existence of said substance can be verified by comparing the indicated relative absorption of said frequency components with the absorption of said frequency components which uniquely is attributable to resonance absorption defined by said characteristic absorption envelope of said substance.

16. A method for remotely locating and identifying deposits of a mineral of the kind which exhibits a magnetic resonance effect that is characterized by absorption of radio frequency electromagnetic energy by spin systems of the mineral at a natural resonance frequency with a characteristic envelope having a known linewidth, and the effect being further characterized by characteristic radio frequency electromagnetic radiation by the spin systems as they release the absorbed energy, the radiation comprising a characteristic decay oscillation transient, said method comprising:

transmitting towards the earth a repetition of abruptly terminated radio frequency electromagnetic pulses of the same frequency as the resonance frequency;

receiving from the direction of the earth, during intervals between successive transmitted pulses, radio frequency electromagnetic signals of the same frequency as that of the transmitted pulses;

rectifying the said received radio frequency electromagnetic signals, sampling the rectified radio frequency electromagnetic signals at a plurality of spaced times during the period of the said characteristic decay oscillation transient, and indicating the relative amplitudes of the sampled signals so that the existence of said characteristic decay oscillation transient can be verified by comparing the ratios of the sampled signals with corresponding ratios of the characteristic decay oscillation transient.

(References on following page)

References Cited

UNITED STATES PATENTS

| | | | |
|---|---|---|---|
| 2,909,725 | 10/1959 | Bell | 324—0.5 |
| 2,968,761 | 1/1961 | Zimmerman | 324—0.5 |
| 3,019,383 | 1/1962 | Varian | 324—0.5 |
| 3,060,371 | 10/1962 | Townsend | 324—0.5 |
| 3,238,446 | 3/1966 | Zimmerman | 324—0.5 |

OTHER REFERENCES

Nuclear Magnetic Resonance, E. R. Andrew, Cambridge University Press, 1955, pp. 35 and 36.

RUDOLPH V. ROLINEC, *Primary Examiner.*

M. J. LYNCH, *Assistant Examiner.*